(12) United States Patent
Sharif et al.

(10) Patent No.: US 9,854,430 B1
(45) Date of Patent: Dec. 26, 2017

(54) DIGITAL TRANSMISSION SYSTEM TO COLLECT IN REAL TIME A PLURALITY OF DISPARATE TIME/DATE RELATED SUBSTANTIATION EVENTS TO CONFIRM THE IDENTITY OF A SIGNATORY IN CONJUNCTION WITH THE AFFIXING OF AN ELECTRONIC SIGNATURE ON A MOBILE DEVICE

(71) Applicants: Faizaan Sharif, Scottsdale, AZ (US); Zachary L. Lovelady, Scottsdale, AZ (US)

(72) Inventors: Faizaan Sharif, Scottsdale, AZ (US); Zachary L. Lovelady, Scottsdale, AZ (US)

(*) Notice: Subject to any disclaimer, the term of this patent is extended or adjusted under 35 U.S.C. 154(b) by 0 days.

(21) Appl. No.: 14/999,444

(22) Filed: May 5, 2016

Related U.S. Application Data

(60) Provisional application No. 62/389,570, filed on Mar. 2, 2016, provisional application No. 62/179,479, filed on May 8, 2015.

(51) Int. Cl.
| | |
|---|---|
| *H04W 8/20* | (2009.01) |
| *G06F 21/10* | (2013.01) |
| *H04W 12/12* | (2009.01) |
| *H04W 4/02* | (2009.01) |
| *H04M 1/725* | (2006.01) |
| *H04W 84/04* | (2009.01) |
| *H04W 84/12* | (2009.01) |

(52) U.S. Cl.
CPC ....... *H04W 8/205* (2013.01); *H04M 1/72547* (2013.01); *H04W 4/02* (2013.01); *H04W 12/12* (2013.01); *G06F 21/10* (2013.01); *H04M 2250/64* (2013.01); *H04M 2250/68* (2013.01); *H04W 84/042* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,067,531 A | 5/2000 | Hoyt et al. | |
| 7,051,364 B1 | 5/2006 | Tackman et al. | |
| 7,146,343 B2 | 12/2006 | Donahue | |
| 7,363,509 B2 | 4/2008 | Farquharson et al. | |
| 8,190,904 B2 | 5/2012 | Hatter et al. | |
| 8,307,218 B2 | 11/2012 | Laurie et al. | |
| 2006/0171539 A1* | 8/2006 | Winningstad | H04M 1/05 380/270 |
| 2008/0028455 A1* | 1/2008 | Hatter | G06F 21/305 726/10 |
| 2008/0209516 A1 | 8/2008 | Nassiri | |

(Continued)

*Primary Examiner* — Daniel Lai
(74) *Attorney, Agent, or Firm* — Knobbe, Martens, Olson & Bear LLP

(57) ABSTRACT

A real time digital transmission system that, in order to substantiate the identity of a signatory that has affixed an electronic signature to a device carried by the signatory to a plurality of disparate remote geographical locations, (1) transmits data defining time/date related events immediately on the occurrence of the events, the events including article events, location-derived events, visual events, audio events, optical machine-readable data events, and signature events, and (2) creates an evidentiary record of each event including the time and date of occurrence of each event.

7 Claims, 9 Drawing Sheets

(56) References Cited

U.S. PATENT DOCUMENTS

2011/0238510 A1* 9/2011 Rowen ............... G06K 9/00187
705/16
2012/0041885 A1 2/2012 Parker

* cited by examiner

SELECT SUBSTANTIATION EVENT REQUIREMENTS

36 ↘　37 ↘　EVENT REQUIREMENT

- SMS PIN
- SELFIE (STILL PHOTO OF SIGNATORY)
- DRIVER'S LICENSE (VIDEO/PHOTOGRAPH OF)
- 2$^{ND}$ ID (LIST: PASSPORT, CREDIT CARD, ETC.)
- VIDEO OF SIGNATORY
- VIDEO OF SIGNATORY SIGNING THE ARTICLE
- COMPLETION OF ARTICLE REVIEW BY SIGNATORY
- BAR CODE SCAN
- RETINAL SCAN OF SIGNATORY
- VOICE RECORDING/ID OF SIGNATORY
- GPS LOCATION ON RECEIPT OF ARTICLE
- GPS LOCATION ON SIGNATURE OF ARTICLE
- FINGERPRINT SCAN OF SIGNATORY
- URL OF SIGNATORY DEVICE

CERTIFICATE OF EVIDENCE

Signing ID: 87632998003 — 39
Status: Completed

Created by: — 42      Signatory: — 43                              — 53
Bob Smith                  Jane Doe
User name: bsmith    janedoe@example.com
IP Address: 10.456.789

*Official Seal*

Real Time Substantiation Events — 44                                  19
IP of Signatory Mobile IP Address:  12.543.876
              2016-01-10; 10:28:04
SMS Pin:    Sent 2016-01-14; 08:56:14 — 45
              Verified: 2016-01-14; 09:18:04
Selfie:       Captured via SignaSure mobile app
              2016-01-14; 09:24:52 — 46

Signature: Jane Doe
*Jane Doe*
2016-10-14; 09:21:16

Bar Code scan: Captured via SignaSure mobile
              app 2016-01-14; 09:30:12 — 47                — 52
              ID: Driver's license                                 — 48
Initial Location:   Via GPS, SignaSure mobile app: N 35.105552, W -106.647388
              Via IP: Albuquerque, New Mexico
Signing Location: Via GPS, SignaSure mobile app: N 35.105554, W -106.647390
              Via IP: Albuqueque, New Mexico                — 49
Article creation:  2016-01-14; 8:54:52; created from Template 65821 — 50
Article emailed:   2016-01-14; 08:56:14: to janedoe@example.com from IP
10.456.789                                                   — 51
Article opened:    2016-01-14; 09:18:04: janedoes@example.com at — 52
              IP12.543.876; N 35.105552, W -106.647388
Article review completed:      2016-10-14; 09:15:10 at IP 12.543.876 — 53
Signed:         2016-10-14; 09:21:16 at IP 12.543.876; N 35.105554, W -
              106.647390                                       — 54
Alert:          To 10.456.789 re article signature; 2016-10-14; 09:21:16 — 55

20

*FIG. 9*

DIGITAL TRANSMISSION SYSTEM TO COLLECT IN REAL TIME A PLURALITY OF DISPARATE TIME/DATE RELATED SUBSTANTIATION EVENTS TO CONFIRM THE IDENTITY OF A SIGNATORY IN CONJUNCTION WITH THE AFFIXING OF AN ELECTRONIC SIGNATURE ON A MOBILE DEVICE

This application claims priority based on provisional patent application 62/179,479, filed May 8, 2015, and on provisional patent application 62/389,570 filed Mar. 2, 2016.

This invention relates to data transmission systems.

Further, the invention relates to systems to substantiate/authenticate an electronic signature.

Still further, the invention relates to systems inextricably linked to computers and digital transmission systems.

Those of skill in the art have long endeavored to provide improved data transmission and signature substantiation systems. Accordingly, it would be highly desirable to improve upon existing systems.

Therefore, it is a principal object of the invention to provide an improved digital transmission and electronic signature system.

This and other and further objects of the invention will be apparent from the following detailed description thereof, taken in conjunction with the drawings, in which:

FIG. 6 is a diagram illustrating selectable substantiation events available to an originator in accordance with the invention;

Figure 1:
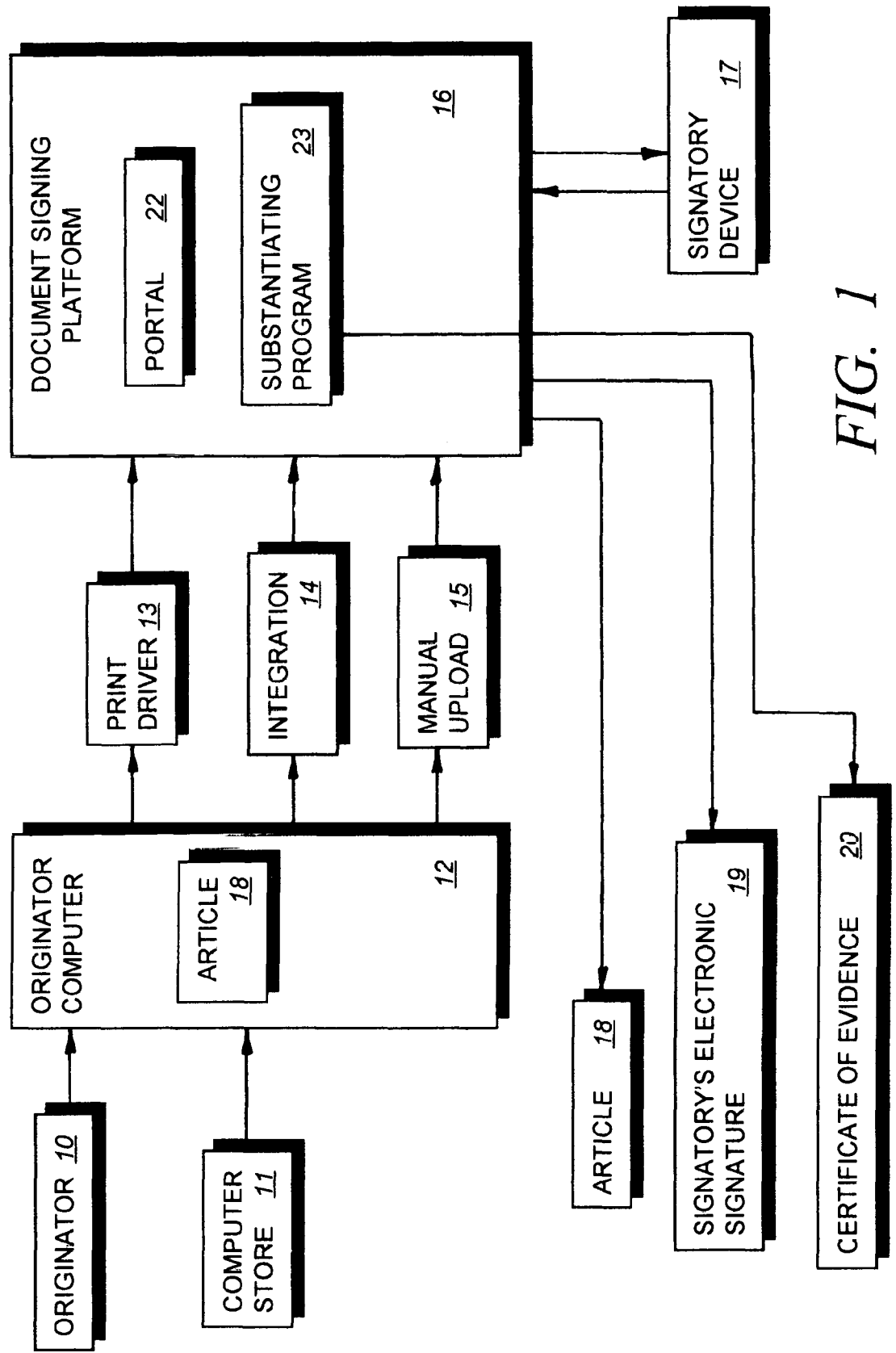
FIG. 1 is a block diagram illustrating in part a digital transmission system constructed in accordance with the invention.

Briefly, in accordance with the invention, provided is a real time digital transmission system that, in order to substantiate that a signatory has affixed an electronic signature to a device carried by the signatory to a plurality of disparate remote geographical locations. In order to substantiate that the signatory has affixed an electronic signature, the transmission system transmits data defining time/date related events immediately on the occurrence of the events. The events include article events, location-derived events, visual events, audio events, optical machine-readable data events, and signature events. The transmission system also, to substantiate that the signatory has affixed an electronic signature, creates an evidentiary record of each event including the time and date of occurrence of each event. The data in at least one of the events replicates data in another of the events to confirm the accuracy of the data in the other of the events. The transmission system comprises a global system of interconnected computer networks; a portal in the global system programmed to receive and store data defining events substantiating the electronic signature; at least one cellular data transmission system in communication with the global system and including a plurality of cellular towers; at least one wi-fi data transmission system in communication with the global system and including at least one wireless access points; at least one communications satellite in communication with the global system; and, a signatory mobile device. The signatory mobile device is configured to electronically communicate, from a plurality of different geographical locations, with the global system via at least one of a group comprising the cellular data transmission system, wi-fi transmission system, and communications satellite. The signatory mobile device includes a camera; a URL identifying the mobile device; a microphone; a memory for recording photographs taken by the camera and audile sounds made into the microphone; and a scanner application to read an optical machine-readable data representation on a signatory photo-identification document. The signatory mobile device is remote from the originator computer. The electronic transmission system also includes a computer store containing data comprising an article requiring a signature; and, an originator computer programmed to retrieve the stored data corresponding to the article; transmit the article to the mobile device, and automatically immediately transmit real time as an event to the portal for storage thereon the time and date of transmission of the article to the mobile device. The mobile device also includes a computer program to receive, when the mobile device is in a first geographical location, the article from the originator computer; automatically immediately transmit in real time as an event to the portal for storage thereon the time and date of receipt of the article by the mobile device along with the URL of the mobile device; automatically immediately transmit in real time as an event to the portal for storage thereon a photograph taken by the camera; automatically immediately transmit in real time as an event to the portal for storage thereon the time and date when review of the article is completed by a signatory; automatically immediately transmit, when the mobile device is in a second geographical location separate from the first geographical location, in real time as an event to the portal for storage thereon the time and date when the article is signed electronically; automatically immediately transmit in real time as an event to the portal for storage thereon an audible recording made on the mobile device; automatically immediately transmit in real time as an event to the portal for storage thereon data read in the optical machine-readable data representation by the scanner application; and, automatically transmit in real time an alert to the originator computer when the article is signed electronically on the mobile device. The alert and the events are each transmitted to the portal separately at different times. The electronic transmission system also includes a substantiating computer program to generate a chronological listing of events which were transmitted to the portal and which occurred from transmission of the article to the mobile device until the article is electronically signed on the mobile device. The electronic transmission system can include the data on the signatory photo-identification document the signatory's name and address. The data can also include medical impairments referenced on a driver's license or other identification provided by the signatory, if any, and physical attributes of said signatory. The data can also include a photograph of the signatory, a digital fingerprint of the signatory, a face recognition template, or the social security number of the signatory.

Turning now to the drawings, which illustrate presently preferred embodiments of the invention by way of example, and not limitation, of the scope of the invention and in which like reference characters refer to corresponding elements throughout the several views, FIG. 1 illustrates in part a digital transmission system constructed in accordance with the invention, and including an originator computer 12 to receive and transmit an article 18 comprising data stored in an operatively associated computer store 11. Article 18 can, for example, consist of something as simple as a request for an electronic signature which enables an originator 10 to compare the electronic signature to a preexisting signature in the possession of originator 10 or can comprise a document to be reviewed and executed electronically by a signatory on a signatory device 17 in the possession of or being used by the signatory. Consequently, while article 18 can in a larger sense comprise a group of alphanumeric or other symbols requiring some action by a signatory, in the presently preferred embodiments of the invention, article 18 requires, on receipt of article 18 by the signatory, that the signatory affix an electronic signature for transmission back to a substantiating program 23 and/or the originator computer 12. By way of further example, article 18 can comprise a lease agreement and the originator can comprise the leasing agent of an apartment complex and the signatory can comprise a potential lessee, or, article 18 can comprise an offer to purchase real estate and the originator 10 can comprise a real estate agent and the signatory can comprise a potential buyer of the real estate, or, article 18 can comprise a document contracting for a trip on a ship in a cruise line and the signatory can comprise a potential traveler on the ship, etc.

Originator computer 12 transmits, when activated by originator 20, article 18 to a document signing platform 16. Platform 16 can, for example, comprise a server computer at any desired location or can comprise the originator computer 12. In the presently preferred embodiment of the invention, the document signing platform comprises a portal 22 and includes a substantiating program 23. The substantiating program 23 functions to receive from signatory device 17 and originator computer 12 and any other desired source events used to substantiate an electronic signature by a signatory. The events typically include a date and time and are used by substantiating program 23 to prepare a certificate of evidence 20 which substantiates an electronic signature made on signatory device 17 by a eignatory.

Article 18 can be uploaded, or transmitted, to document signing platform 16 by any desired means. One way to upload article 18 is to use a system in originator computer 12 that ordinarily is used to transmit for printing a document to a particular printer. For example, originator computer system might utilize an HP printer. The computer would use print driver 13 to generate a "print to HP" signal that ordinarily would cause a document to be sent to the printer. This same signal 13 can be used so that the print document signal causes article 18 to be transmitted electronically via the Internet or any other communication channel to the document signing platform 16. Integration 14 or manual uploading techniques 15 can also be utilized. Once article 18 is received by document signing platform 16, article 18 can be accessed and downloaded by signatory device 17. In another embodiment of the invention, article 18 is, on receipt by document signing platform 16 immediately transmitted to signatory device 17. In a further embodiment of the invention, article 18 is emailed to signatory device 17 by originator 10 via originator computer 12. In still another embodiment of the invention, article 18 is given to the signatory on a thumb drive which can be used to download article 18 onto signatory device 17. In still a further embodiment of the invention, signatory device 17 accesses article 18 via a provided web link. Importantly, however, the presently preferred embodiments of the invention are inextricably linked to computers and electronic transmission systems which permit data to be immediately transmitted in real time by a device (i.e., originator 12, document signing platform 16, and signatory device 17). The immediate real time transmission of an event is believed critical in the practice of the invention because it permits continual efficient up-to-date monitoring of the process for substantiating an electronic signature made on a signatory device, and, importantly, because it minimizes the risk of data manipulation on a signatory device 17. If events are simply stored on signatory device 17 and then later transmitted as a file comprising data defining a collected group of events, the manipulation of data in the file is more readily achieved. If instead an event is immediately transmitted to substantiating program 23 in real time, such manipulation is significantly more difficult to achieve. Accordingly, immediate real time transmission of data defining an event helps to substantiate with a high degree of confidence that an electronic signature has been made by a signatory.

Figure 2:
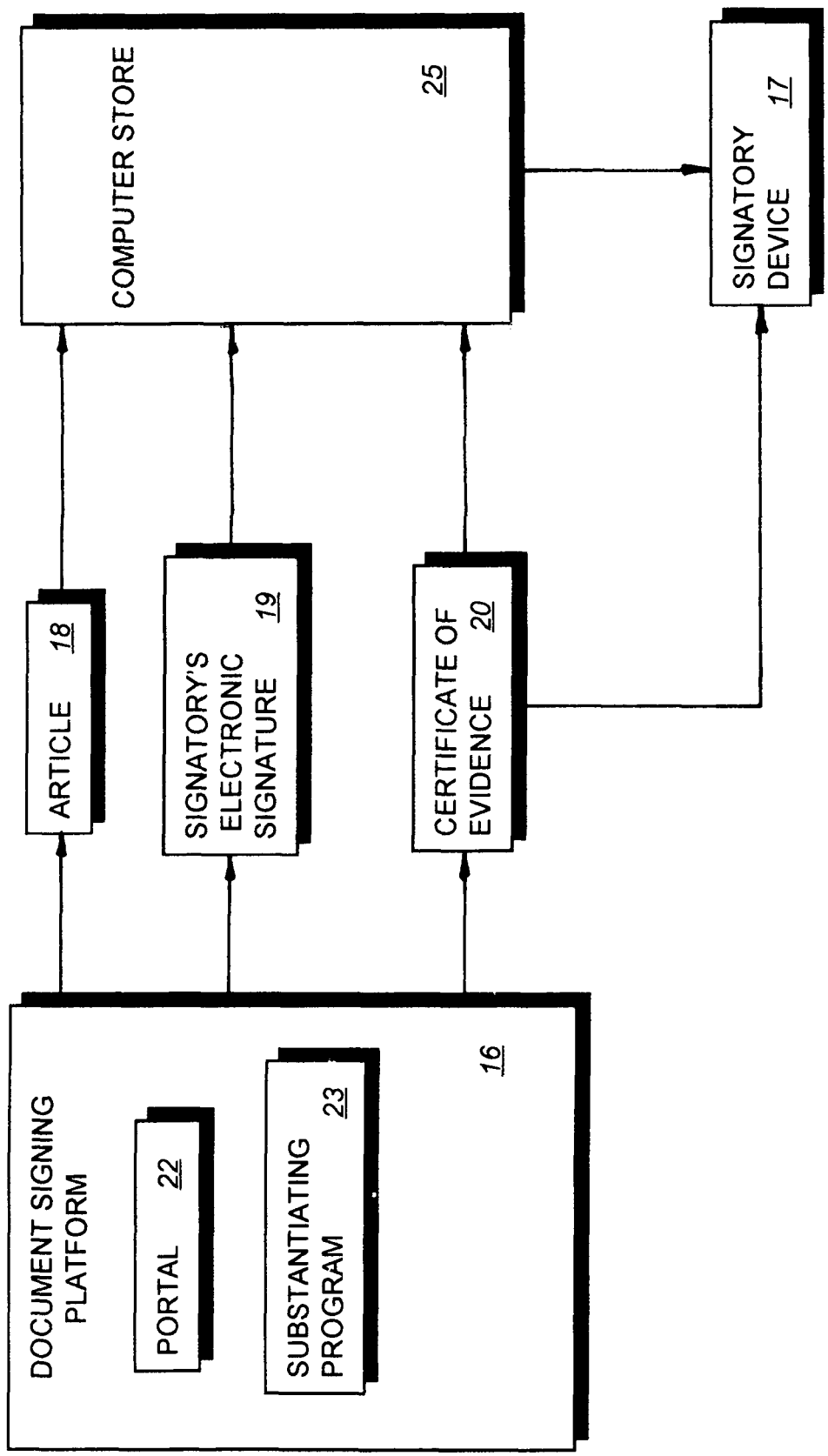
FIG. 2 is a block diagram further illustrating the digital transmission system of FIG. 1.

As can be seen in FIGS. 1 and 2, the substantiating program 23 also can retain article 18 and a signatory's electronic signature 19 for later transmission—along with a certificate of evidence—to a computer store 25. The certificate of evidence can also, as indicated in FIG. 2, be digitally electronically transmitted to signatory device 17 via computer store 25 or by any other desired means.

In one important embodiment of the invention, the signatory device 17 comprises a mobile device 17A which is carried on the person and transported from one geographical location to another geographical location. A mobile device 17A does not comprise a desk top computer or other fixed computer, but instead consists of, for example, an iPhone, iPad, or laptop computer, i.e., mobile device 17A is relatively small and typically is readily carried on the person from one location to another. Mobile device 17A includes a computer, typically a microprocessor, and an associated memory and ordinarily uses electronic transmission systems to receive and transmit data digitally from a plurality of different geographical locations. It is, of course, possible for a mobile signatory device 17A to be connected by cable to an originator computer 12 or document signing platform 16, but such a connector normally is impractical and unlikely in the practice of the invention. The invention is, particularly with respect to a mobile signatory device which is continually transported to a variety of disparate remote geographical locations, inextricably tied to digital transmission systems and to the ability to transmit immediately real time data from a variety of different geographical locations.

Figure 3:
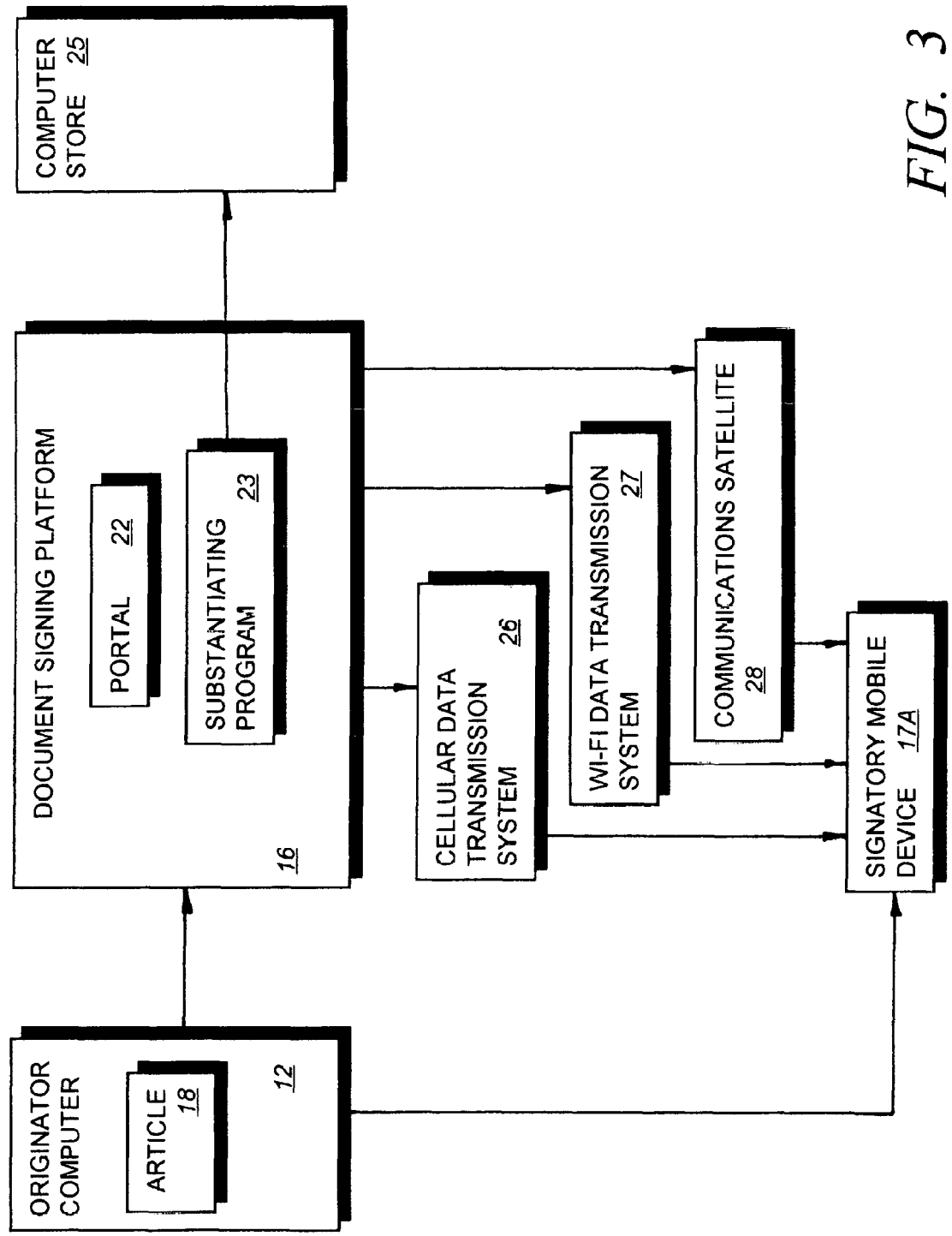
FIG. 3 is a block diagram illustrating digital transmission avenues available in conjunction with transmitting data to a mobile signatory device.
Figure 4:
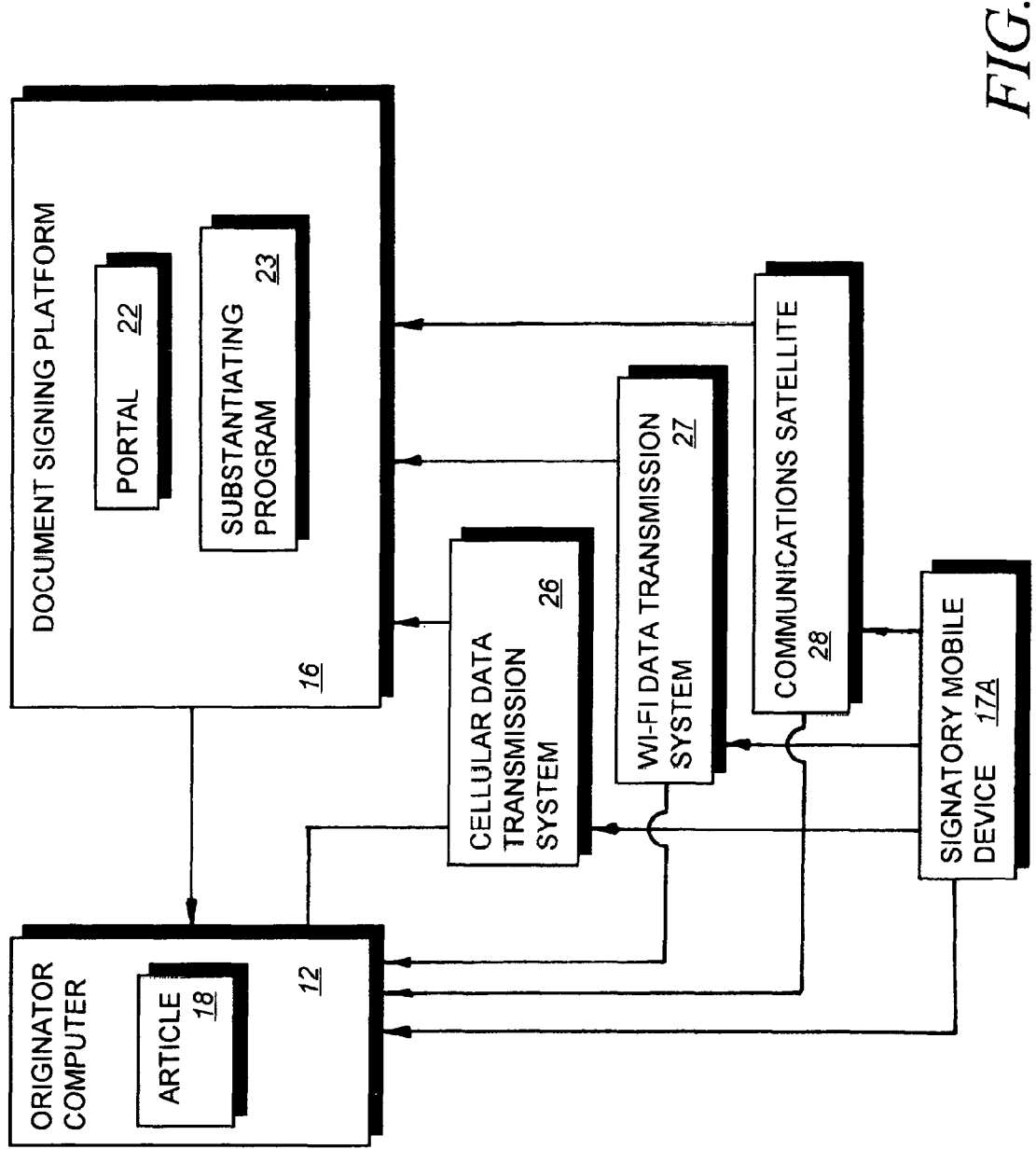
FIG. 4 is a block diagram illustrating digital transmission avenues available in conjunction with the transmission of data from a mobile signatory device.

As shown in FIG. 3, data typically is transmitted from an originator computer 12, from document signing platform 16, or from some other desired source via a cellular data transmission system 26, a wi-fi data transmission system 27, or a communications satellite 28 which communicates with signatory mobile device 17A (or communicates with a fixed signatory device). Similarly, as shown in FIG. 4, data is transmitted to originator computer 12, document signing platform 16, or another desired receiving station via systems 26 and 27 or satellite 28.

Figure 5:
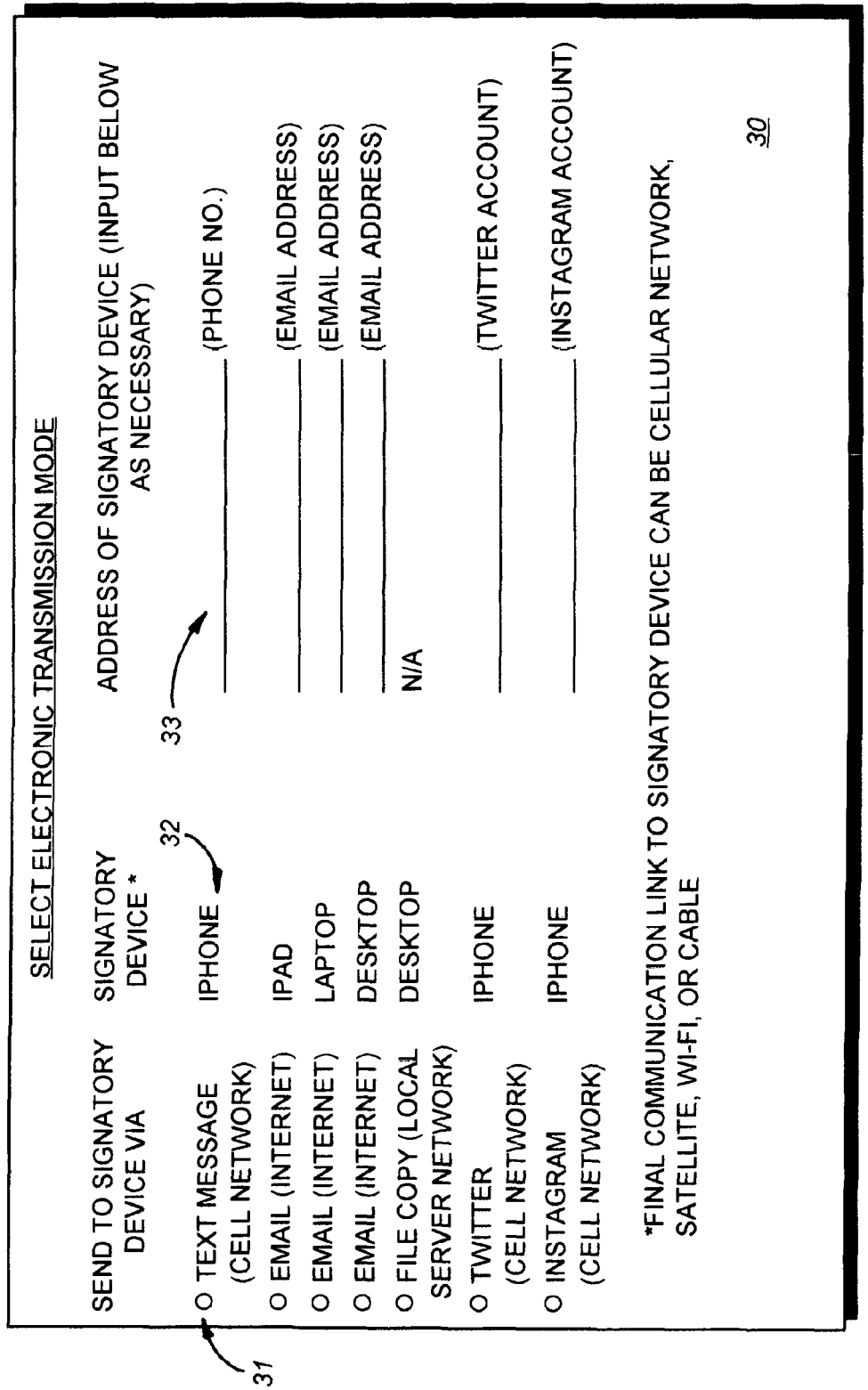
FIG. 5 is a diagram illustrating selectable electronic transmission modes available to an originator in accordance with the invention.

As is illustrated by the menu shown in FIG. 5, originator 10 can select any of a variety of transmission modes 30 to forward article 18 to a signatory device 17 or 17A, to document signing platform 16, or to any other desired receiving station or device. For example, if in FIG. 5 the originator 10 desired to forward by text message an article 18 to a signatory device 17A comprising an iPhone 32, originator 10 can use his computer mouse or mouse pad or other means to click on (i.e., to select) the circle 31 adjacent the words "text message" and enter with his computer keyboard on line 33 the phone number of the iPhone comprising signatory device 17A.

Prior to forwarding an article 18 to a signatory device 17, 17A for review and signature by a signatory, originator 10 can select any of a variety of substantiation events which must, in addition to affixing an electronic signature to an article 18, be carried out by a signatory to complete review of article 18. Each desired substantiation event is, for example, selected by using a mouse or mouse pad or other means to click on (i.e., to select) a circle 36 adjacent a desired 37 event requirement. The signatory is, along with article 18 or at some desired point in time, provided with a list of the substantiation events which must be performed by the signatory.

Figure 7:
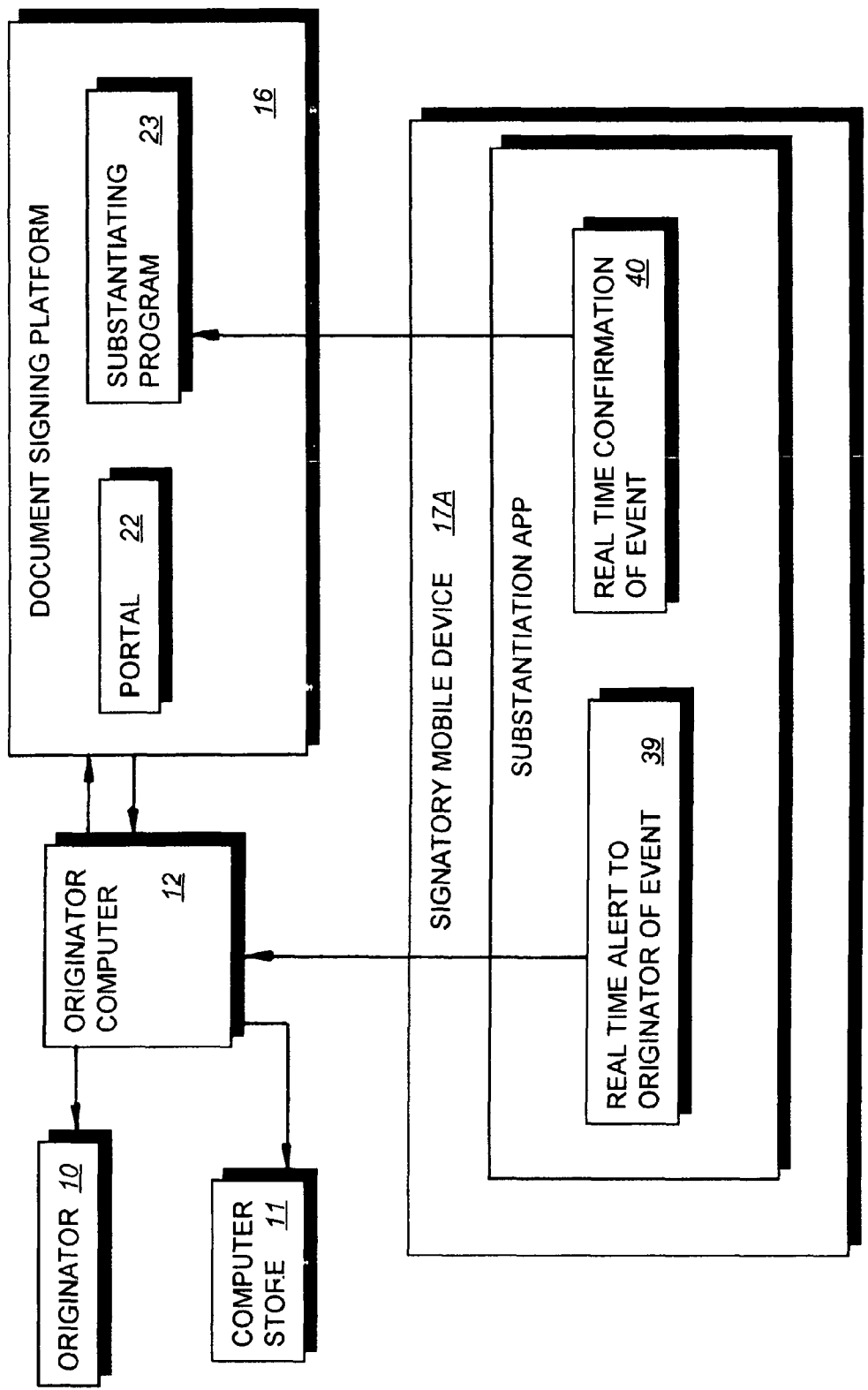
FIG. 7 is a block diagram illustrating the digital transmission of real time confirmations and alerts from a signatory mobile device.

FIG. 7 illustrates the real time transmission of confirmation 40 of an event to substantiating program 23 or another desired receiving source. FIG. 7 also illustrates the real time transmission of an alert 39 to originator computer 12. As used herein, real time indicates that data is processed by a computer within milliseconds so that it is available virtually immediately as feedback.

Figure 8:
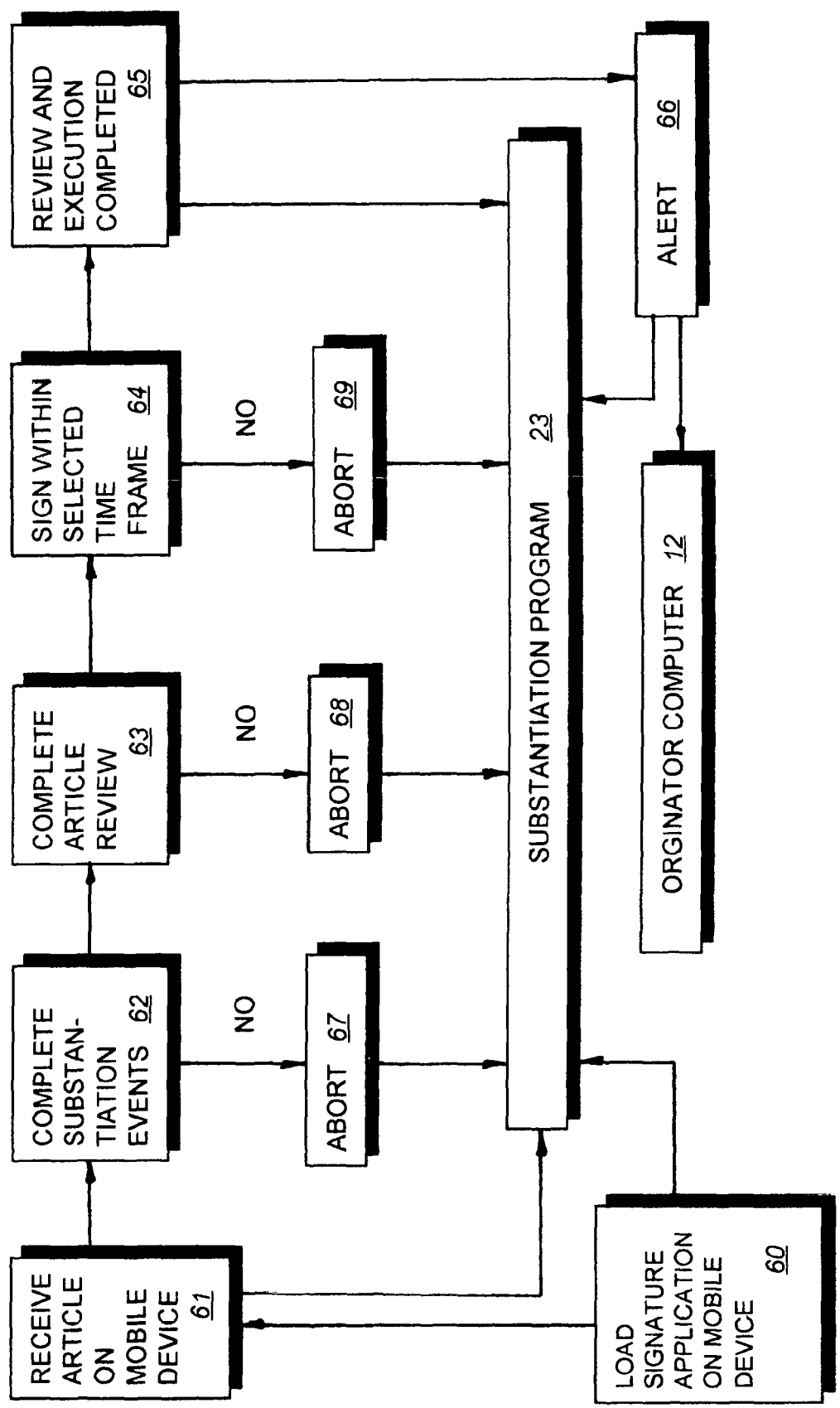
FIG. 8 is a block diagram illustrating one procedure followed by a signatory in reviewing and signing an article transmitted to the signatory; and, FIG. 9 is a diagram illustrating a certificate of evidence generated by a digital transmission system constructed in accordance with the invention.

FIG. 8 illustrates a process which can be followed by originator 10 and by a signatory in accordance with one embodiment of the invention. A signature application (i.e., an "app") is loaded 60 on a signatory mobile device 17A. The signature app facilitates the completion and real time confirmation of various substantiating events that are required by originator 10. In other embodiments of the invention, the mobile signatory device 17A or other signatory device 17 need not load and utilize an app, but can simply access a portal 22 or other desired source and use in conjunction with portal 22 pre-existing features available on the signatory device 17, 17A.

Originator 10 creates article 18. Once article 18 is created, the time and date of creation are immediately automatically forwarded in real time to substantiating program 23 for inclusion 50 (FIG. 9) on a certificate of evidence 20 created by program 23.

After the signature app is loaded 60 on the signatory device 17A, article 18 is transmitted to device 17A (by email for example) and is received 61 by the device 17A. The time and date of transmission by email are immediately automatically forwarded in real time to substantiating program 23 for inclusion 51 (FIG. 9) on a certificate evidence 20 created by program 23. The time and date of the opening of article 18 on signatory device 17A by the signatory are immediately automatically forwarded real time to substantiating program 23 for inclusion 52 (FIG. 9) on a certificate of evidence 20 created by substantiating program 23.

The signatory must complete the substantiation events 38 selected and required by originator 10. If the signatory refuses to complete the required substantiation events and notes such by making an appropriate entry, the process for electronically signing article 18 is aborted 67 and such event is immediately automatically forwarded real time to substantiating program 23. Or, if the signatory does not complete the required substantiation events within a specified period of time, the process for electronically signing article 18 is aborted 67 and such event is immediately automatically forwarded real time to program 23. In addition to being forwarded to program 23, a real time alert typically would be forwarded to originator computer 12 to notify the originator 10 that the signing process has been aborted.

One substantiation event 38 that typically is required is for the signatory to review 63 the entire article 18, or at least to review each of designated sections (called "hotspots") of article 18, and to indicate that article 18 and any specified paragraphs or sections of article 18 have been reviewed by using a mouse, or mouse pad, or other device to check a "section reviewed" box, by typing in a desired response, etc. The signatory may not skip reviewing and confirming review of any designated sections of article 18. The time taken by a signatory to review a section or page of an article 18 can be tracked and immediately recorded by substantiation program 23. Each time the review of a section or page of article 18 is completed, the time and date of such completion can be forwarded real time to substantiation program 23. Such tracking can be accomplished at a web site at which a signatory is reviewing article 18, or can be accomplished at a signatory device 17, 17A at which a signatory is reviewing article 18. In order to indicate that review of a section of article 18 has been completed, a signatory can be required to affix an electronic signature to the section of an article 18 which has just been reviewed by the signatory. Affixing an electronic signature to sections of article 18 or otherwise making entries on article 18 to confirm review of article 18 effectively physically transforms article into a "reviewed" article format, which format can be transmitted to substantiation program 23 for storage at portal 22 or at another desired location.

Article 18 typically is reviewed by reading (and if necessary scrolling through) the article 18 on the display screen of the signatory device 17A and by making the necessary entries to confirm that each section of article 18 has been reviewed. Each time a signatory makes an entry confirming that a section of article 18 has been reviewed, the time and date of such entry and description of the section of article 18 reviewed is, as noted above, preferably immediately transmitted real time to substantiating program 23. Similarly, once article 18 has been completely reviewed, the time and date of such completion is preferably immediately transmitted real time to substantiating program 32, and, an alert may be immediately transmitted real time to originator computer 12. If the signatory fails to complete the review of article 18 within a specified period of time, or makes an entry via his computer indicating that the signatory refuses to complete the review or wants to make changes to article 18, the signing process is aborted 68 and a real time notification of such is immediately transmitted real time to program 23. An alert may also be immediately transmitted real time to originator computer 12. Completion of the review of article 18 can be included 53 on the certificate of evidence 20 (FIG. 9).

As a further example of a substantiation event which may be required, a web app may prompt a signatory to allow access to the signatory's webcam. If the signatory refuses, then the signing process is aborted 67. If the signatory permits access, then the signatory centers his or her face in front of the webcam, and clicks a button, touches a display screen to "click" a button, etc. to capture the image. The image is automatically immediately electronically transmitted and uploaded to a background server which, as defined herein, comprises part of portal 22. The image can, if desired, be attached to and comprise part of a certificate of evidence 20 (FIG. 9). The image on the certificate of evidence 20 can, if desired, comprise a thumbnail in order to minimize the size of the space on certificate of evidence 20 which is occupied by the image.

If article 18 is not electronically signed within a selected time frame 64, the signing process is aborted 69 and an immediate real time notification and alert are forwarded real time to program 23 and originator computer 12. Of note is that some substantiation events may not be completed until the time the electronic signature is affixed to article 18 by the signatory. For example, a required substantiation event may be that the signatory make a video of himself or herself affixing an electronic signature to article 18 by moving a finger over a touch screen to produce a signature. Completion of the electronic signature can be included 54 on the certificate of evidence 20, as can be the alert 55 to the originator computer 12.

Once the signing process, including affixing the signatory's electronic signature to article 18, is completed, substantiation program 23 produces a certificate of evidence 20 and forwards it, along with a copy of article 18 and a replication of the electronic signature 19, to a store computer 25 for storage thereon. The signatory, using device 17, 17A or some other computer, ordinarily can access store computer 25 to review or download these items, as can originator 10. Or, the certificate of evidence 20, electronic signature 19 and article 18 can be forwarded to signatory by any desired means including, for example, by substantiation program 23 or originator computer 12.

An example of a certificate of evidence 20 is illustrated in FIG. 9 and includes an official seal 53, an signing ID 39 identifying the transaction at hand (i.e., the article, originator 10, signatory, etc.), data 42 identifying the originator, data 43 identifying the signatory, the electronic signature 19 of the signatory, and the date and time 52 the electronic signature was affixed.

A variety of substantiation events 38 are memorialized on the certificate of evidence 20 and include the signatory's IP address 44, data 45 defining verification of an SMS pin; the date and time a selfie was captured using an app on mobile device 17A, the initial location 48 (by IP and by GPS) of the mobile device 17A, the location 49 of the mobile device when the electronic signature was affixed using device 17A, the date and time of creation 50 of article 18, the date and time 51 article 18 was emailed to device 17A; the date and time 52 article 18 was opened on device 17A and viewed by the signatory; the date and time and IP address 53 when the review of the article was completed; the date and time and location 54 at which an electronic signature was affixed to article 18 using device 17A; and, the date and time 55 an alert was sent to the originator computer (IP address 10.456.789) 12 confirming that an electronic signature was affixed to article 18.

The certificate of evidence 20, article 18, and electronic signature 19 can be stored electronically, or if desired, in the form of a paper copy, or microfiche, or CD, or DVD, etc. Electronic storage can, in conventional fashion, be in the "cloud", in a secure server, etc.

As noted, document signing platform 16 permits a document to be retrieved by a signatory for signature. Platform 16 also permits originator 10 to access platform 16 to retrieve a signed or unsigned article 18, to manage (including editing) an article 18, to generate or obtain a report concerning the chain of events leading up to and including the generation of a certificate of evidence 20, and to manage various signatories or originators 10 using the substantiation system.

An important feature of the invention is that a wide variety of substantiation events can be utilized to compile a certificate of evidence 20 which substantiates the affixation of an electronic signature to an article 18. Such events include (1) article events including transmission of article 18 to mobile device or other signatory device, transmission of article 18 to computer store 25, transmission of article 18 to document signing platform 16 for storage and, if necessary, downloading, (2) location-derived events including the GPS location of signatory devices and IP addresses, (3) visual events including photographs or videos taken by a signatory or signatory device of the signatory, the signatory's fingerprint, and a retina scan of the signatory, (4) audio events including a sound recording made on the signatory device 17, 17A, (5) optical machine—readable data events including scanning and interpreting bar codes, and (6) signature events including review by a signatory of an article 18, and electronic signature by a signatory. Further, and importantly, information provided by one event often helps to confirm—or contradict—information obtained in another event. In particular, the ability to scan a bar code on a driver's license or passport or other object can help confirm information provided via another event. Information contained in the bar code on a driver's license can confirm information like height, weight, photograph, medical impairments, etc. on the driver's license as well as confirm whether the individual who is shown by a "selfie" taken by the signatory matches the description on the driver's license. An example of a common medical impairment noted on a driver's license is the requirement to wear glasses.

If desired, when article 18 is forwarded to a signatory device 17, 17A, a guided document review 34 can be provided which sets forth one or more sections of the document. This guided document review can comprise a written description of a section(s) of the document, can comprise a video of an individual setting forth a section(s) of the document, or can comprise both the written description and the video description. The signatory ordinarily may not be required to make use of the guided document review prior to signing. However, as one of the substantiation events, the signatory can, as noted, be required to review one or more sections of the document and to verify (by, for example, checking a box confirming that the signatory read or viewed and understood the written or video description of the section(s) of the document) that the appropriate document review was completed.

A variety of procedures for electronically signing documents are known in the art and are not described herein. However, importantly, as noted earlier herein, the signatory must carry out the substantiation events specified by originator 10.

As used herein, portal 22 comprises, in conventional fashion, an Internet site, a data base system, and one or more computers or "back end servers". Data used to produce a certificate of evidence 20 is typically stored on the computers, or back end servers.

The functionality of a signatory device 17, 17A used in the practice of the invention can vary, but such devices normally have a camera and can take and store photographs, have a microphone and can record a person's voice or other sounds, can access the Internet, can receive and make telephone calls, have a clock and calendar and track time of day and date, and can load and use a variety of computer programs, or "apps". Such devices also normally can access and use social media including Facebook, Instagram, and Twitter.

In one embodiment of the invention, a signatory does not download and use an app but instead accesses with device 17, 17A portal 22 via the Internet and reviews an article 18 at a web site. The signatory utilizes a device 17, 17A to complete certain required substantiation events such as taking and transmitting to the web site a "selfie".

Having described my invention in such terms as to enable those skilled in the art to understand and practice it, We claim:

1. A real time transmission system that, in order to substantiate the identity of a signatory that has affixed an electronic signature to a device carried by the signatory to a plurality of disparate geographical locations,
   transmits data defining time/date related events immediately on the occurrence of the events, the events including article events, location-derived events, visual events, audio events, optical machine-readable data events, and signature events, and
   creates an evidentiary record of each event including the time and date of occurrence of each event,
the data in at least one of the events replicating data in another of the events to confirm the accuracy of the data in said another of the events,
said transmission system comprising
(a) a global system of interconnected computer networks;
(b) a portal in said global system programmed to receive and store data defining events substantiating the electronic signature;
(c) at least one cellular data transmission system in communication with said global system and including a plurality of cellular towers;
(d) at least one wi-fi transmission system in communication with said global system and including at least one wireless access point;
(e) at least one communications satellite in communication with said global system;
(f) a signatory mobile device
   (i) configured to electronically communicate, from a plurality of different geographical locations, with said global system via at least one of a group consisting of said cellular data transmission system, wi-fi transmission system, and communications satellite,
   (ii) including a camera,
   (iii) including a URL identifying said mobile device,
   (iv) including a microphone,
   (v) including a memory for recording photographs taken by said camera and audible sounds made into said microphone,
   (vi) remote from said originator computer, and
   (vii) including a scanner application to read an optical machine-readable data representation on a signatory photo-identification document,
(g) a computer store containing data comprising an article requiring a signature;
(h) an originator computer programmed to
   (i) retrieve said stored data corresponding to said article,
   (ii) transmit said article to said mobile device, and
   (iii) automatically immediately transmit real time as an event to said portal for storage thereon the time and date of transmission of said article to said mobile device;
(i) a computer program on said mobile device to
   (i) receive, when said mobile device is in a first geographical location, said article from said originator computer,
   (ii) automatically immediately transmit in real time as an event to said portal for storage thereon a photograph taken by said camera,
   (iii) automatically immediately transmit in real time as an event to said portal for storage thereon a photograph taken by said camera,
   (iv) automatically immediately transmit in real time as an event to said portal for storage thereon the time and date when review of said article is completed by a signatory,
   (v) automatically immediately transmit, when said mobile device is in a second geographical location separate from said first geographical location, in real time an event to said portal for storage thereon the time and date when said article is signed electronically,
   (vi) automatically immediately transmit in real time as an event to said portal for storage thereon an audible recording made on said mobile device,
   (vii) automatically immediately transmit in real time as an event to said portal for storage thereon data read in said optical machine-readable data representation by said scanner application, and
   (viii) automatically immediately transmit in real time an alert to said originator computer when said article is signed electronically on said mobile device,
   said alert and said events each being transmitted to said portal separately at different times; and,
(j) a substantiating computer program to generate a listing of chronological events which were transmitted to said portal and which occurred from transmission of said article to said mobile device until said article is signed electronically on said mobile device.

2. The electronic transmission system of claim 1 wherein said data on said signatory photo-identification document includes the signatory's name and address.

3. The electronic transmission system of claim 2 wherein said data on said signatory photo-identification document further includes medical impairments, if any, and physical attribute of said signatory.

4. The electronic transmission system of claim 3 wherein said data on said signatory photo-identification document further includes a photograph of said signatory.

5. The electronic transmission system of claim 1 wherein said data on said signatory photo-identification document further includes a digital fingerprint of said signatory.

6. The electronic transmission system of claim 1 wherein said data on said signatory photo-identification document further includes a face recognition template.

7. The electronic transmission system of claim 1 wherein said data on said signatory photo-identification document further includes the social security number of said signatory.

* * * * *